US009288794B2

(12) United States Patent
Beale

(10) Patent No.: US 9,288,794 B2
(45) Date of Patent: Mar. 15, 2016

(54) COMMUNICATIONS SYSTEMS, COMMUNICATIONS DEVICE, INFRASTRUCTURE EQUIPMENT AND METHOD

(75) Inventor: Martin Warwick Beale, Kingsdown (GB)

(73) Assignee: SCA IPLA Holdings Inc., New York, NY (US)

( * ) Notice: Subject to any disclaimer, the term of this patent is extended or adjusted under 35 U.S.C. 154(b) by 332 days.

(21) Appl. No.: 13/878,306

(22) PCT Filed: Sep. 21, 2011

(86) PCT No.: PCT/GB2011/051775
§ 371 (c)(1),
(2), (4) Date: Jul. 1, 2013

(87) PCT Pub. No.: WO2012/046016
PCT Pub. Date: Apr. 12, 2012

(65) Prior Publication Data
US 2013/0272236 A1    Oct. 17, 2013

(30) Foreign Application Priority Data
Oct. 8, 2010    (GB) .................................. 1016986.0

(51) Int. Cl.
*H04W 72/04*    (2009.01)
*H04W 28/26*    (2009.01)

(52) U.S. Cl.
CPC ........ *H04W 72/0406* (2013.01); *H04W 72/042* (2013.01); *H04W 28/26* (2013.01)

(58) Field of Classification Search
USPC .......................................... 370/329; 455/450
See application file for complete search history.

(56) References Cited

U.S. PATENT DOCUMENTS 5,133,081 A * 7/1992 Mayo ..................... H04H 20/06
340/905
6,021,333 A * 2/2000 Anderson ............. G10L 19/012
455/517

(Continued)

FOREIGN PATENT DOCUMENTS

CN          1554167 A     12/2004
JP       2008-72700 A      3/2008

(Continued)

OTHER PUBLICATIONS

Search Report issued Feb. 1, 2011 in United Kingdom Patent Application No. 1016986.0.

(Continued)

*Primary Examiner* — Edan Orgad
*Assistant Examiner* — Steven Willmore
(74) *Attorney, Agent, or Firm* — Oblon, McClelland, Maier & Neustadt, L.L.P.

(57) ABSTRACT

A communications system, including a mobile radio network including local base stations to communicate data to and from mobile communications devices via a wireless access interface. The mobile radio network is adapted to include a message processor and a message store, the message store arranged to store an indication of each of one or more message exchanges in a set of predetermined message exchanges between the base stations and one or more of the communications devices, each message exchange including a predetermined set of predetermined messages and requiring predetermined up-link and/or down-link communications resource for communicating the message exchange on the up-link and/or down-link, between a base station and the communications device.

21 Claims, 10 Drawing Sheets

(56) References Cited

U.S. PATENT DOCUMENTS

| | | | |
|---|---|---|---|
| 8,464,265 B2* | 6/2013 | Worley | G06F 9/5016 718/104 |
| 2003/0050068 A1* | 3/2003 | Woxberg | H04W 28/26 455/450 |
| 2004/0081127 A1* | 4/2004 | Gardner | H04N 1/00204 370/338 |
| 2004/0087320 A1* | 5/2004 | Kim | H04H 20/16 455/458 |
| 2006/0129804 A1 | 6/2006 | Satkunanathan et al. | |
| 2007/0130274 A1 | 6/2007 | Lee et al. | |
| 2007/0243879 A1* | 10/2007 | Park | H04L 41/0806 455/453 |
| 2008/0175183 A1* | 7/2008 | Devroye | H04B 7/022 370/315 |
| 2008/0192925 A1* | 8/2008 | Sachs | H04L 12/5692 380/29 |
| 2009/0109912 A1* | 4/2009 | DiGirolamo | H04L 5/0053 370/329 |
| 2009/0111470 A1* | 4/2009 | Thakare | H04W 36/0055 455/436 |
| 2009/0116434 A1* | 5/2009 | Lohr | H04L 5/0007 370/329 |
| 2009/0305676 A1 | 12/2009 | Zhang | |
| 2010/0042886 A1* | 2/2010 | Kim | H04W 72/042 714/748 |
| 2010/0157922 A1* | 6/2010 | Kim | H04L 5/0094 370/329 |
| 2010/0208684 A1 | 8/2010 | Cho et al. | |
| 2011/0116393 A1* | 5/2011 | Hong | H04W 72/082 370/252 |
| 2011/0176637 A1* | 7/2011 | Hu | H04L 1/0029 375/316 |
| 2012/0030358 A1* | 2/2012 | MacKenzie | H04W 52/0216 709/226 |
| 2012/0195275 A1* | 8/2012 | Ghaus | H04W 28/26 370/329 |
| 2012/0309441 A1* | 12/2012 | Eriksson | H04L 5/0094 455/509 |
| 2012/0322484 A1* | 12/2012 | Yu | H04W 4/08 455/509 |
| 2013/0095821 A1* | 4/2013 | Lim | H04W 72/0406 455/426.1 |
| 2013/0279445 A1* | 10/2013 | Moulsley | H04W 72/1252 370/329 |
| 2013/0322387 A1* | 12/2013 | Kim | H04W 74/002 370/329 |

FOREIGN PATENT DOCUMENTS

| | | |
|---|---|---|
| WO | WO 03/024028 A1 | 3/2003 |
| WO | WO 2009/051402 A2 | 4/2009 |
| WO | WO 2010/018509 A2 | 2/2010 |

OTHER PUBLICATIONS

International Search Report issued Dec. 6, 2011 in PCT/GB2011/051775 submitting English translation only.

Chinese Office Action issued Sep. 28, 2015 in corresponding Application No. 201180048741.1 (11 pages).

* cited by examiner continuation of diagram

Invention removes need for RACH and allocation signalling marked ∗

COMMUNICATIONS SYSTEMS, COMMUNICATIONS DEVICE, INFRASTRUCTURE EQUIPMENT AND METHOD

FIELD OF THE INVENTION

The present invention relates to communications systems which are arranged to communicate data with mobile communications devices via a wireless access interface. The present invention also relates to communications devices which communicate data with mobile radio networks, infrastructure equipment for mobile radio networks and methods for communicating data with mobile radio networks.

BACKGROUND OF THE INVENTION

Mobile communication systems have evolved over the past ten years or so from the GSM System (Global System for Mobile Communications) to the 3G system and now include packet data communications as well as circuit switched communications. The third generation project partnership (3GPP) has now begun to develop a mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Human to human (H2H) communications can be defined generally as data which is transmitted by a human to another human or at least data that is transmitted for presentation to a human being. Although mobile communications systems have previously focused on H2H communications there is a desire to cater for communications to and/or from machines which are referred to generally as machine type communications (MTC). Machine to machine (M2M) communications are a form of MTC communications where both the transmitter and receiver of the communications are both machines. Machine initiated MTC communications can be characterised as communicating data which has been generated from a source automatically, for example in response to some other stimulus or event reporting some attribute of the machine or some monitored parameter or so-called smart metering. Thus whilst voice human communications can be characterised as being communications requiring a communications session of some minutes with data being generated in bursts of several milliseconds with pauses there between or video human communications can be characterised as streaming data at a substantially constant bit rate, MTC communications can generally be characterised as sporadically communicating relatively small quantities of data although it will be appreciated that there is also a wide variety of possible MTC communications.

As will be appreciated it is generally desirable to provide mobile communications which use a radio communications bandwidth and core network resources as efficiently as possible, and although this is true for all types of data communications, MTC communications can present a new challenge to the development of mobile communications systems.

SUMMARY OF THE INVENTION

According to the present invention there is provided a communications system, comprising a mobile radio network, the mobile radio network including a plurality of base stations arranged to communicate data to and from mobile communications devices via a wireless access interface. The mobile radio network is adapted to include a message processor and a message store, the message store is arranged to store an indication of each of one or more message exchanges in a set of predetermined message exchanges between the base stations and one or more of the communications devices, each message exchange comprising a predetermined set of predetermined messages and requiring predetermined up-link and/or down-link communications resource for communicating the message exchange on the up-link and/or down-link, between a base station and the communications device. The message processor is arranged in operation to generate, using the indication of the message exchanges stored in the message store, a conversation allocation message for communication to the mobile communications device, the conversation allocation message providing an indication to the mobile communications device of an allocation of communications resource on the down-link and/or the up-link for communicating the one or more messages of the message exchange, and to communicate the conversation allocation message to the mobile communications device, and in response to the conversation allocation message, the communications device and a base station to which the communications device is attached are arranged to communicate the messages of the message exchange using the resources allocated by the conversation allocation message.

Embodiments of the present invention can provide an arrangement in which a message controller performs a function of detecting that a message exchange is to be made between one of the communications devices communicating via the mobile radio network and one of the base stations, the message exchange being one of a predetermined set of message exchanges. The message controller may form part of the base station or another infrastructure equipment of a mobile radio network. The message processor includes an associated message store, which is arranged to store data which defines a set of message exchanges which the message processor can recognise. The data may take the form for example of a table. The message store identifies, for each message exchange an amount of communications resources, such as an amount of shared channel resources, which are required to communicate the messages which may include transmitting data on the up-link or the down-link or both the up-link and the down-link and/or a set of one or more signalling messages. There are various reasons for the message exchange, including communicating a data message on the up-link or the down-link or a predetermined sequence of signalling messages such as that which might be required for a mobile communications device to change attachment from one base station to another.

The term "conversation allocation message" as used herein refers to an adapted allocation message, which may be communicated from a mobile radio network to a communications device for allocating resources on the up-link and/or down-link for communicating a message exchange. The message exchange may include the communication of only signalling messages or signalling messages and data messages, which may be communicated on the up-link or the down-link or the up-link and the down-link. The conversation allocation message is therefore aimed at replacing the allocation messages, which in known systems must be communicated for each of the signalling messages and/or data messages of a message exchange.

When the message processor receives an indication that the message exchange is to be communicated between the one of the communications devices and one or more of the base stations, the message processor detects that the message exchange is one of the predetermined set of message exchanges by analysing a pre-defined set of massages stored in the message store. The message processor can recognise the message exchange using one of a plurality of predefined triggers, such as recognising a data message which is to be delivered, for example by using higher layer signalling or for example where a header or similar metadata is provided with the data message when received for example at the base station. In another example, a predefined trigger may be a predetermined event such as an indication that the mobile communications device is to handover from one of the base stations to another. The message processor then retrieves an indication of the up-link or down-link resources which are required to communicate the message exchange, which may include the communication of one or more signalling messages and may also include the commutation of one or more data messages on the up-link or down-link or both the up-link and the down-link. Alternatively the message exchange may only include communicating one or more signalling messages. The message processor may operate in combination with other protocol layer functions, such as the Media Access Control layer and the Radio Resource layer processors, to identify the resources which are required to communicate the associated signalling messages and data channel resources which are required to communicate the message exchange.

In one example, the data channel resources and the signalling channel resources may be provided using a shared communications channel such as for example a down-link shared channel or an up-link shared channel. Thus in combination with the conventional functions of the base station, the message processor reserves communications resources such as, for example time slots and frequency on the down-link and/or up-link shared channel for the communication of the message exchange. The message processor then forms a conversation allocation message. In one example the conversation allocation message bundles a complete allocation of the reserved communications resources for communicating the signalling messages and/or the data message into a single message and communicates this conversation allocation message to the communications device.

Upon receipt of the conversation allocation message the communications device is provided with an indication of all of the downlink resources and or uplink resources which are required in order to send and receive all of the associated signalling messages and the data message of the message exchange, which may include receiving a data message on the downlink or transmitting an up-link data message.

Known arrangements require allocation messages and for up-link communication request messages to be communicated between the communications device and the base station to reserve communications resources, for example on the shared channel, in order to communicate each of the associated signalling messages and optionally a data message. It has therefore been recognised that there is a requirement to provide a more efficient arrangement for communicating message exchanges, where for example, the message exchange requires a deterministic set of one or more signalling messages and the communication of an amount of data on the up-link and/or the down-link. One application may be for MTC communications, which are characterised as comprising a predictable format and type of message as well as a relatively small amount of data.

Embodiments of the present invention use a conversation allocation message to pre-allocate some or all communications resources, thereby providing a saving in proportion to the communications resources which are required to allocate the resources for the communication of the associated signalling messages and the data message. In one example for a mobile radio network arranged in accordance with a 3GPP LTE standard, resources reserved by communicating a conversation allocation message via a control channel such as the physical downlink control channel (PDCCH) in order to allocate resources on the downlink shared channel (DL-SCH) and/or the up-link shared channel (UL-SCH). As a result, there is a proportional saving because only one conversation allocation message needs to be sent to allocate all the resources for the message exchange, the message exchange comprising one or more signalling messages and optionally one or more data messages rather than communicating an allocation message for each signalling message and each data message of the message exchange. To reserve resources on the up-link the communications device may transmit a scheduling request message on a channel such as the physical random access channel, for which a response is received from the base station on a control channel, such as a PDCCH. Accordingly the efficient allocation of up-link resources is improved.

In some embodiments the communications device is arranged to act as an MTC device. For this example, where the communications device is an MTC device, typically data messages for communication to or from the MTC device may require a relatively small amount of data. Thus, the amount of signalling required to communicate a small data message to an MTC device makes the communication of that message inefficient in comparison to an amount of overhead required to both communicate the associated signalling messages and also communicate the allocation messages required for both the signalling message and the data message. Furthermore, given a quantity of MTC devices which may be operating within a cell served by a base station, access to a control channel which is required for allocating resources such as on the PDCCH for LTE may be so large as to cause significant congestion which may reduce an ability of the MTC devices to receive communications on the down-link or send communications on the up-link. Accordingly, embodiments of the present invention aim to relieve congestion on the control channel (such as on the PDCCH for LTE) which is provided by a wireless access interface between base stations and communications devices for allocating resources on for example a down-link shared channel or an up-link shared channel.

As will be appreciated embodiments of the present invention include a message processor communicating a conversation allocation message on the downlink in response to a random access message communicated by a communications device on the up-link for allocating to the communications device up-link resources.

Various further aspects and features of the present invention are defined in the appended claims and include an infrastructure equipment, a communications device and a method of communicating.

BRIEF DESCRIPTION OF THE DRAWINGS

Embodiments of the present invention will now be described with reference to the accompanying drawings in which like parts have the same designated references and in which.

DESCRIPTION OF EXAMPLE EMBODIMENTS

Figure 1:
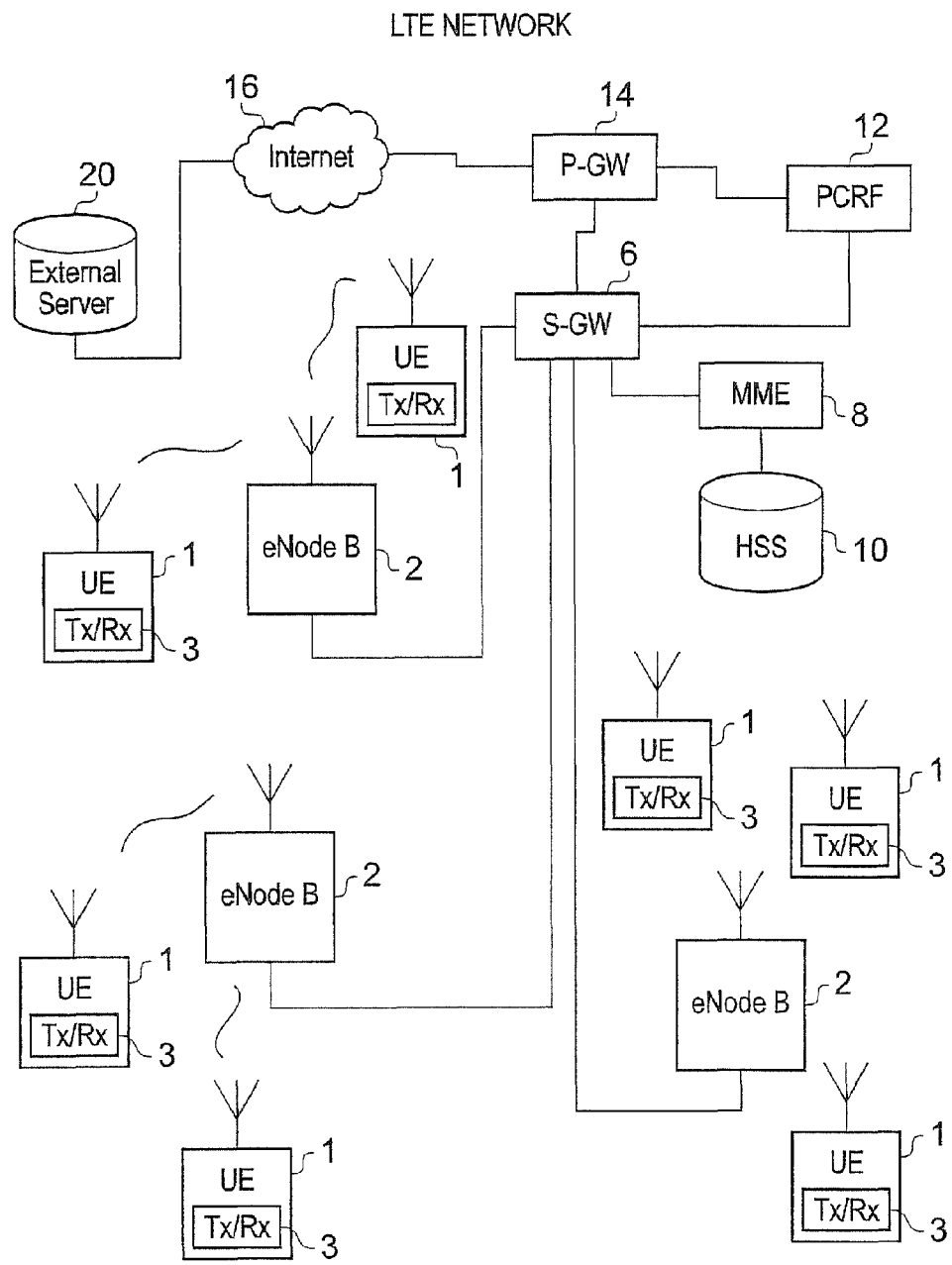
FIG. 1 is a schematic block diagram of mobile communications devices operating within a mobile radio network in accordance with a LTE 3GPP standard.

Embodiments of the present invention will now be described with reference to an implementation which uses a mobile radio network operating in accordance with the 3GPP Long Term Evolution (LTE) standard. FIG. 1 provides the example architecture of an LTE network. As shown in FIG. 1 and as with a conventional mobile radio network, mobile communications devices designated as user equipment (UE) 1 are arranged to communicate data to and from base stations 2 which are referred to in LTE as enhanced NodeBs (eNodeB). For transmitting and receiving data via the wireless access interface the communications devices 1 each include a transmitter/receiver unit 3.

The base stations or eNodeB's 2 are connected to a serving gateway S-GW 6 which is arranged to perform routing and management of mobile communications services to the communications devices 1 as they roam throughout the mobile radio network. In order to maintain mobility management and connectivity, a mobility management entity (MME) 8 manages the enhanced packet service (EPS) connections with the communications devices 1 using subscriber information stored in a home subscriber server (HSS) 10. Other core network components include the policy charging and resource function (PCRF) 12 a packet data gateway (P-GW) 14 which connects to an interne network 16 and finally to an external server 20. More information may be gathered for the LTE architecture from the book entitled *"LTE for UMTS OFDM and SC-FDMA based radio access"*, Holma H. and Toskala A. page 25 ff.

Figure 2:
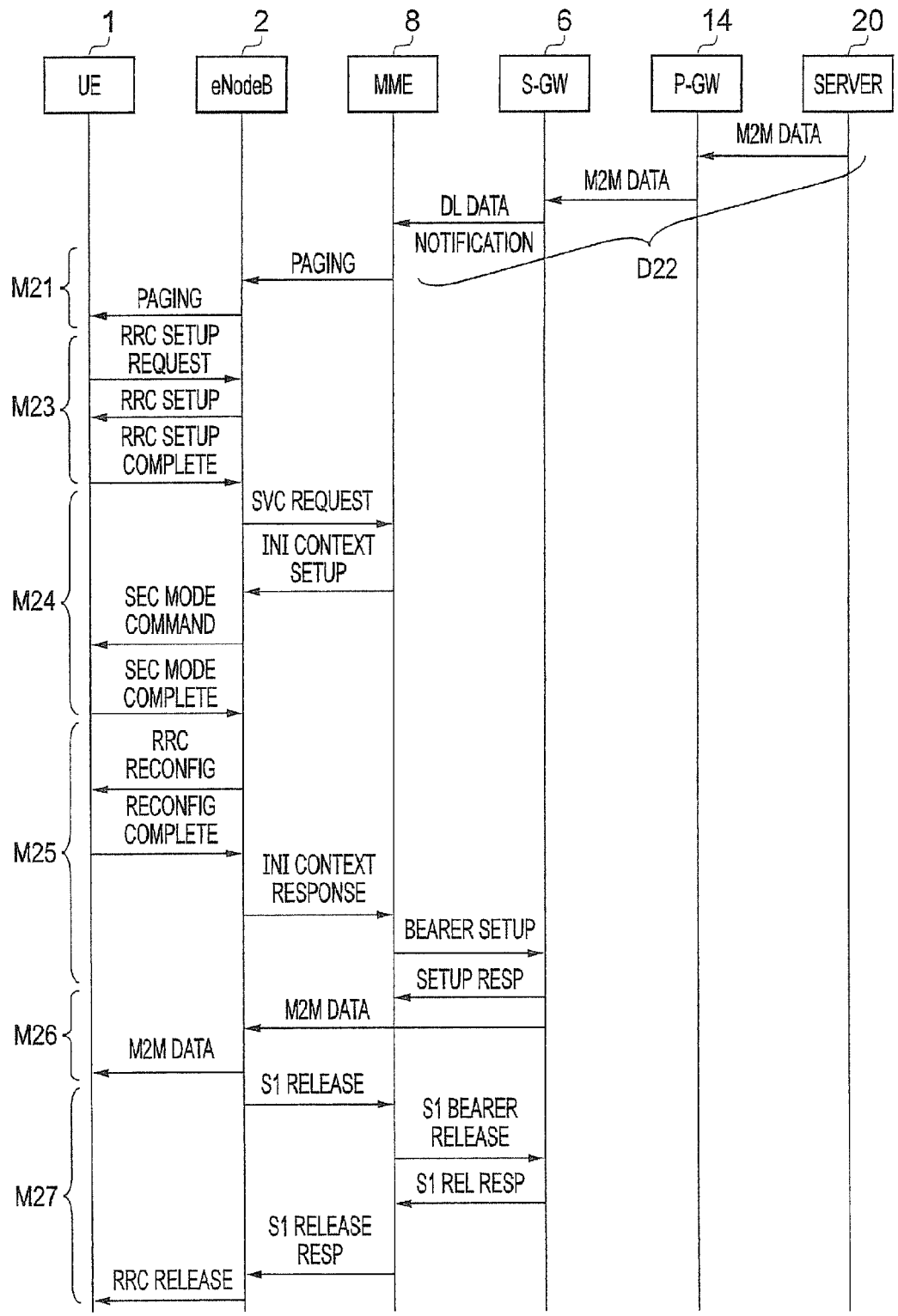
FIG. 2 is a signalling message flow diagram illustrating one example of a message exchange in which both signalling and data messages are communicated from the mobile radio network to a communications device according to a conventional operation.

A typical message exchange which is required in order to communicate a data message on the down-link to the communications device, such as that which might be communicated to an MTC communications device is shown in FIG. 2. In FIG. 2 each of the server 20, the packet gateway 14, the serving gateway 6 the mobility management entity 8, the eNodeB 2 and the mobile communication device 1 are illustrated communicating different signalling messages as well as data messages according to a message exchange. For example, a data message D22 is received from the server 20, which may be an MTC communication, the mobile communications device being in one example an MTC device. The message M21 as shown in FIG. 2 is a paging message informing the communication device 1 that it needs to connect to the network in order to allow a data message D22 to be communicated to the communications device 1. A message exchange M23 provides a radio resource communication set up which requires both up-link and down-link signalling messages between the communications device 1 and the eNodeB 2. Messages M24 provide a SRV request and a security mode commands which also include messages communicated to the MME 8. Further messages M25 which are communicated in order to set up a bearer using a down-link shared channel include RRC reconfiguration messages as well as bearer confirmation set up messages. Finally, the M2M data is communicated as data message D26 followed by message M27 which release the reserved communications resources.

In FIG. 2 all of the messages between the communications device 1 and the eNode B 2 that are within M23 through to M27, including D26, are part of a message exchange. As will be appreciated, in addition to the messages between the eNode B 2 and communications device 1, there are also messages between the eNode B and MME (and between MME and S-GW) that might be triggered by messages within the message exchange. However these network messages are not part of the "message exchange" on the wireless access interface between the eNodeB 2 and the mobile communications device 1.

As will be appreciated by those familiar with 3GPP standards for LTE, and also for other mobile communications systems, each signalling message or each data message requires up-link or down-link communications resources to be allocated via an allocation message which for the example of an LTE standard is an allocation message communicated on a physical downlink control channel (PDCCH) on the down-link which then allocates resources on the downlink shared channel or up-link shared channel as appropriate, which are used to carry either constituent signalling messages or constituent data messages of the message exchange.

Figure 3A:
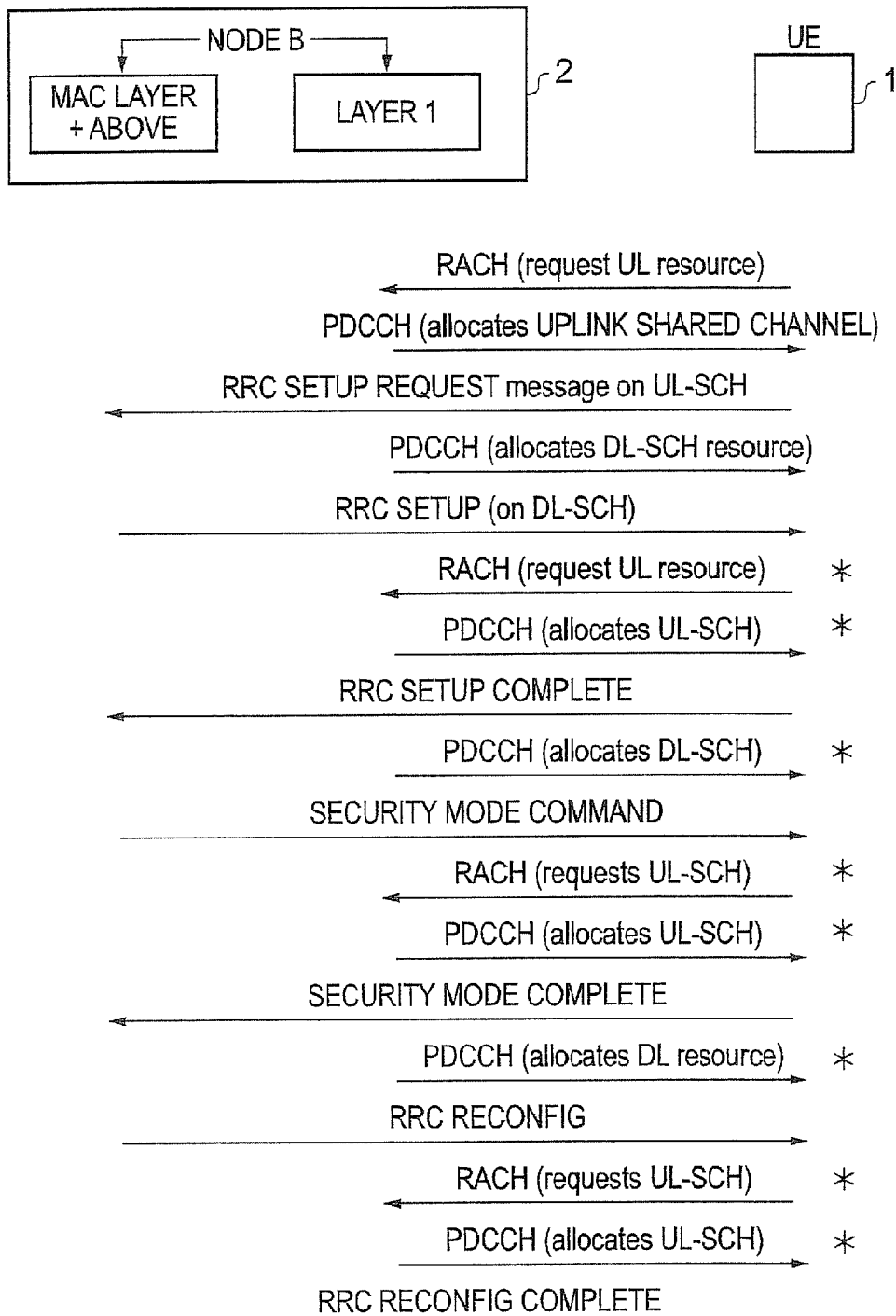
FIG. 3 is an example message exchange providing a similar example to the example shown in FIG. 2 with allocation messages also included, but only showing messages exchanged between the mobile communications device and base stattion.
Figure 3B:
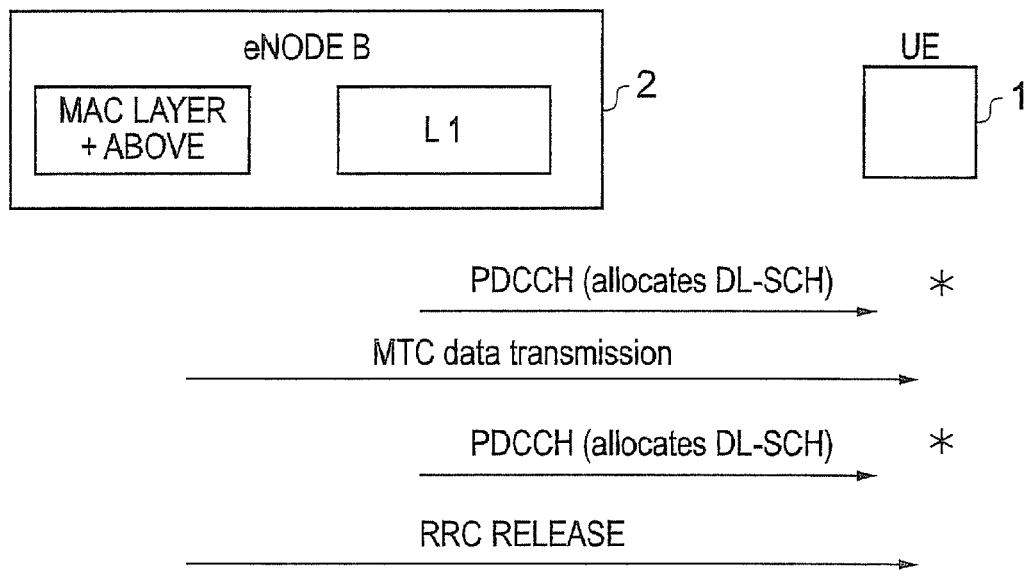

For the example of MTC communications devices the data messages communicated to or from the MTC communications device are typically relatively small amounts of data. Therefore given the number of messages which must be communicated between the communications device 1 and the eNodeB 2 as well as the mobility management entity 8 a significant amount of allocation messages must be communicated, each allocation message requiring its own PDCCH. Furtheimore, for the example of allocation of resources on the up-link shared channel the allocation first requires the communication of a request message or buffer status report transmitted on a random access channel (RACH) or physical random access channel (PRACH). As such, given that data messages communicated to or from the MTC communications devices may represent a relatively small amount of data, the relative efficiency of communicating the data message can be low as a result of a relatively high overhead required for this communication. The overhead includes communications resources for an amount of associated signalling messages, and the accompanying allocation messages via the PDCCH, as well as communications on the RACH if appropriate. An illustration of this inefficiency can be seen from FIGS. 3(a) and 3(b), which provides a representation of an example message exchange for down-link data message communication to the communications device and includes signalling messages associated with allocating resources on the up-link and down-link shared channels via the PDCCH as well as requests for up-link shared channel resources made by the communications device on the RACH. These messages are marked with an asterix "*".

In addition to a relative inefficiency of communicating relatively small amounts of data, there is concern that the number of such communications may be high for a mobile radio network supporting MTC communications devices. The capacity to deliver allocation messages may be restricted, because the bandwidth of a communications channel such as a PDCCH is limited. An amount of demand on the PDCCH for example in LTE may therefore cause congestion for networks which support MTC communications devices. In other systems such as UTRA, an HS-SCCH can allocate HS-DSCH (DL), the HS-SCCH performing a similar role to that of the PDCCH in LTE. In e-UTRA it is possible to persistently allocate resources in the up-link and the down-link. This semi-persistent resource allocation requires higher layer signalling which can be wasteful and slow. It may not be possible to tailor the resources assigned by semi-persistent scheduling to the sequence of messages within a message exchange, leading to a waste of allocated DL-SCH or UL-SCH resource. This is because, with semi-persistent scheduling, certain resources are allocated on a periodic basis. Since the messages within the message exchange are not necessarily periodic (see the gaps in FIG. 2), those periods when there is no transmission are wasted because the DL-SCH is allocated to a particular communications device, but that communications device cannot use the resource.

Message Processor/Store Conversation Allocation Messages

Embodiments of the present invention can provide an arrangement which more efficiently communicates an exchange of messages to or from communications devices and in one application can make communications with MTC communications devices more efficient. As will be explained in the following paragraphs example embodiments utilise a "conversation allocation message" which is a single allocation message which allocates all of the uplink and/or down-link communications resources, for example on up-link or down-link shared channels, which are required to communicate all of the necessary signalling messages as well as the data message itself for communication of a predefined message exchange. For the example of FIG. 2, a message exchange might be one or all of M23, M24, M25, D26 and M27 or could be just M23, M24 and M25.

Although an example is provided in the following paragraphs of a message exchange which includes communicating a down-link data message, it will be appreciated that the present technique can equally be applied in a communication of a data message on the uplink from an MTC communications device to the base station, which would be sent in response to the MTC communications device sending a request message on an RACH. Furthermore, the technique can be applied to any message exchange involving only signalling messages, and some further examples will be provided below with reference to FIGS. 9 and 10.

Figure 4:
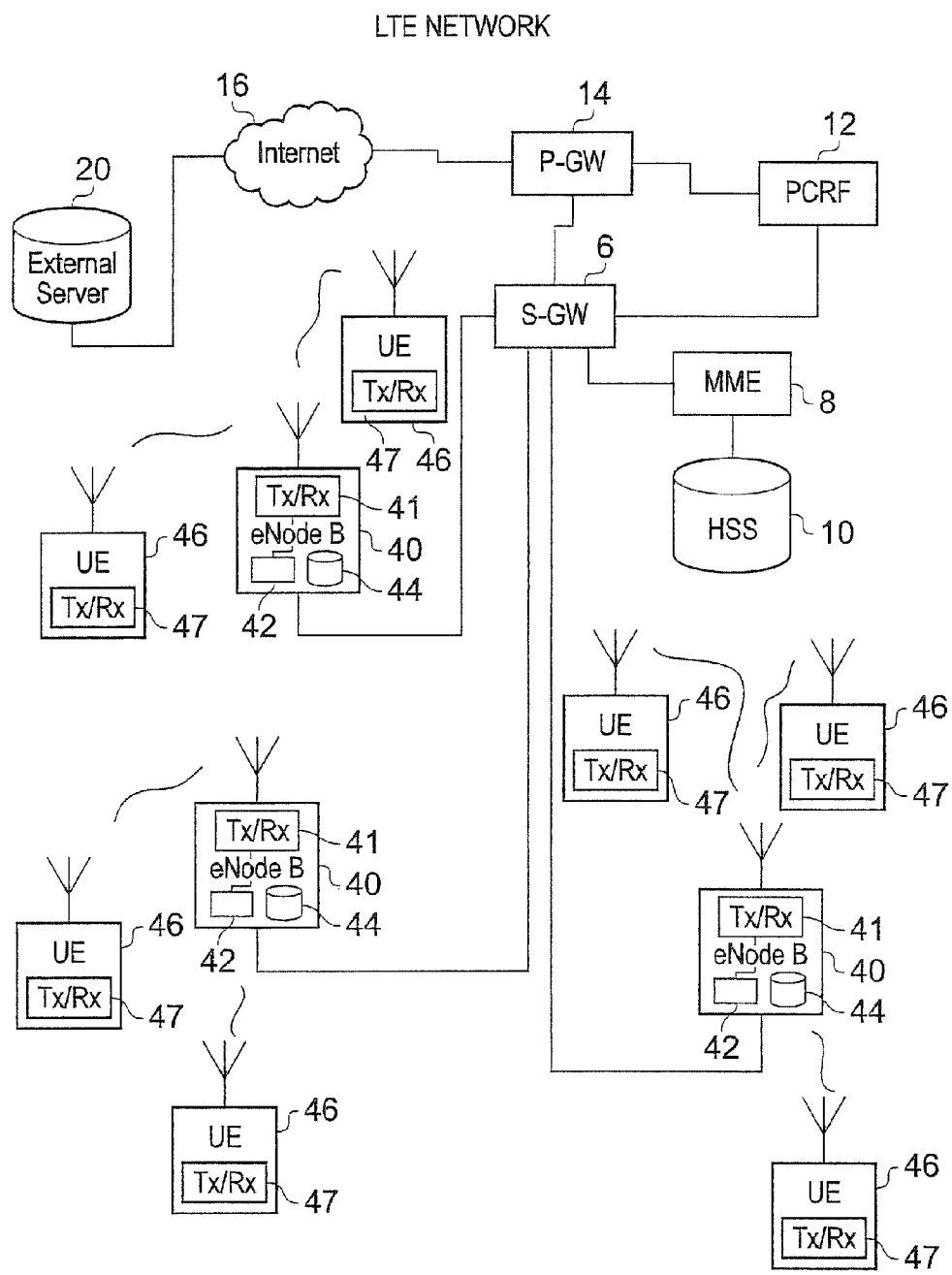
FIG. 4 is a schematic block diagram of a mobile radio network arranged in accordance with the 3GPP LTE standard but adapted in accordance with an embodiment of the present invention.

FIG. 4 provides an example illustration of an embodiment of the present invention which is based on the network diagram shown in FIG. 1 of a mobile radio network operating in accordance with the 3GPP LTE standard. Since FIG. 4 corresponds essentially to FIG. 1 only the differences between FIG. 4 and FIG. 1 will be described.

In FIG. 4 the base stations or enhanced Node B devices 40 each include a message processor 42, a transmitter/receiver unit 41 and an associated message store 44. Within the message store 44 there is stored data representing a table or similar arrangement which provides an identification of each of one or more predefined message exchanges which may be communicated to and/or from an MTC communications device.

Embodiments of the present invention have been devised in recognition that MTC communications in particular follow a predetermined format both in terms of the quantity of the data in a data message and the order, format and quantity of associated signalling messages in a message exchange, which can be described as formulaic. Accordingly, based on these observations an amount of allocation message signalling can be reduced and/or a method of allocating the signalling can be optimised or at least improved. To this end, a conversation allocation message is generated by the message processor 42 for communication to the communications device which is to take part in the message exchange. The conversation allocation message is arranged to allocate all of the either or both of up-link and down-link communications resources for communicating associated signalling messages on a down-link and/or up-link shared channel for establishing a bearer and also the down-link or up-link communications resources for example on a down-link/up-link shared channel for communication of the data message to or from the mobile network from or to the communications device.

Accordingly, the message store 44 includes a table which identifies for each message exchange resources which are required to communicate that message exchange. For example, an indication of the resources may specify the associated signalling messages which are exchanged between the communications device and the base station, the quantity of data which must be communicated in those signalling messages and their order. Furthermore, since the data message is a predetermined data message, the amount of data required to be communicated for example on the down-link to communicate that data message is also included within the table. Thus the table provides an indication of the communications resources whether on the up-link or the down-link for communicating associated signalling messages required for establishing a bearer to communicate the data message, as well as an indication of the resources for example the down-link resources which are required in order to communicate the data message.

Figure 5:
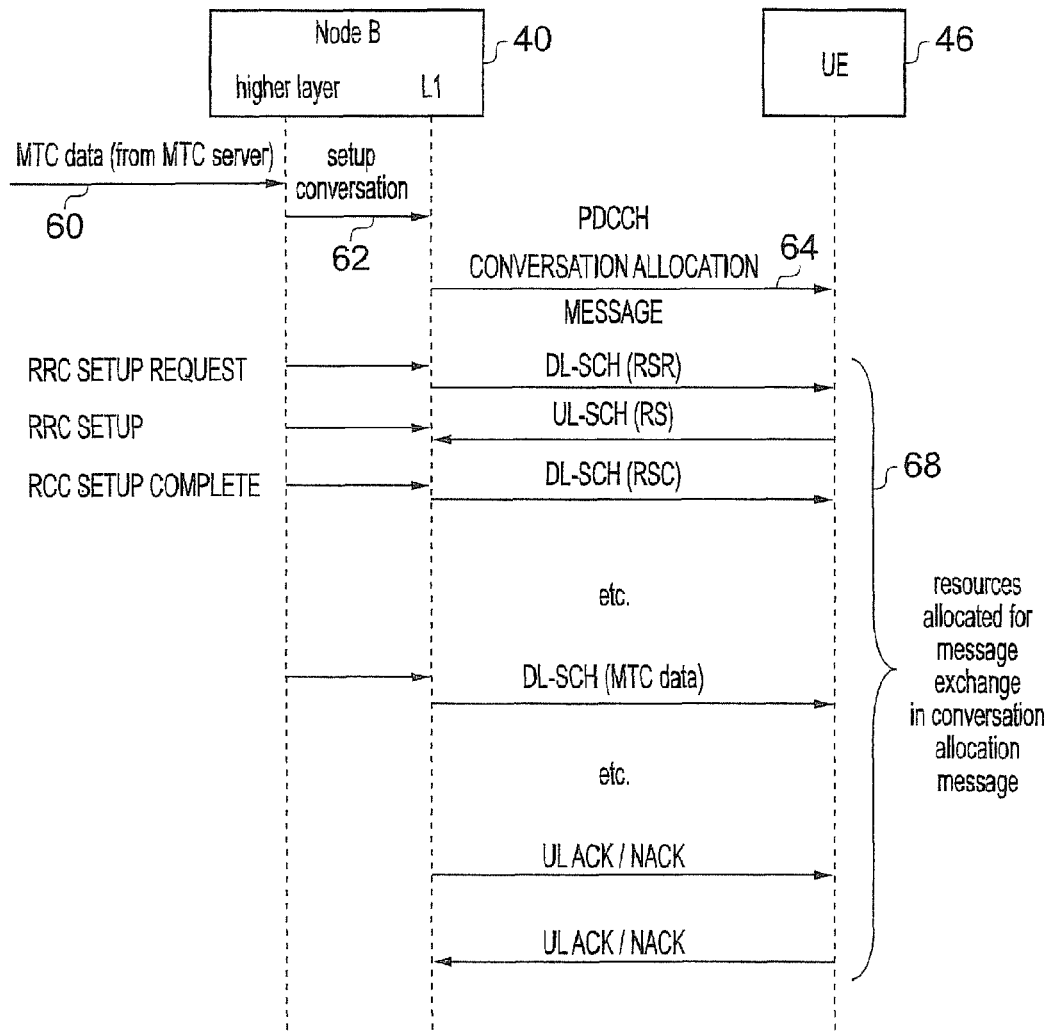
FIG. 5 is an example message flow diagram corresponding to the example shown in FIGS. 3a and 3b but adapted in accordance with an example embodiment of the present invention.
Figure 6:
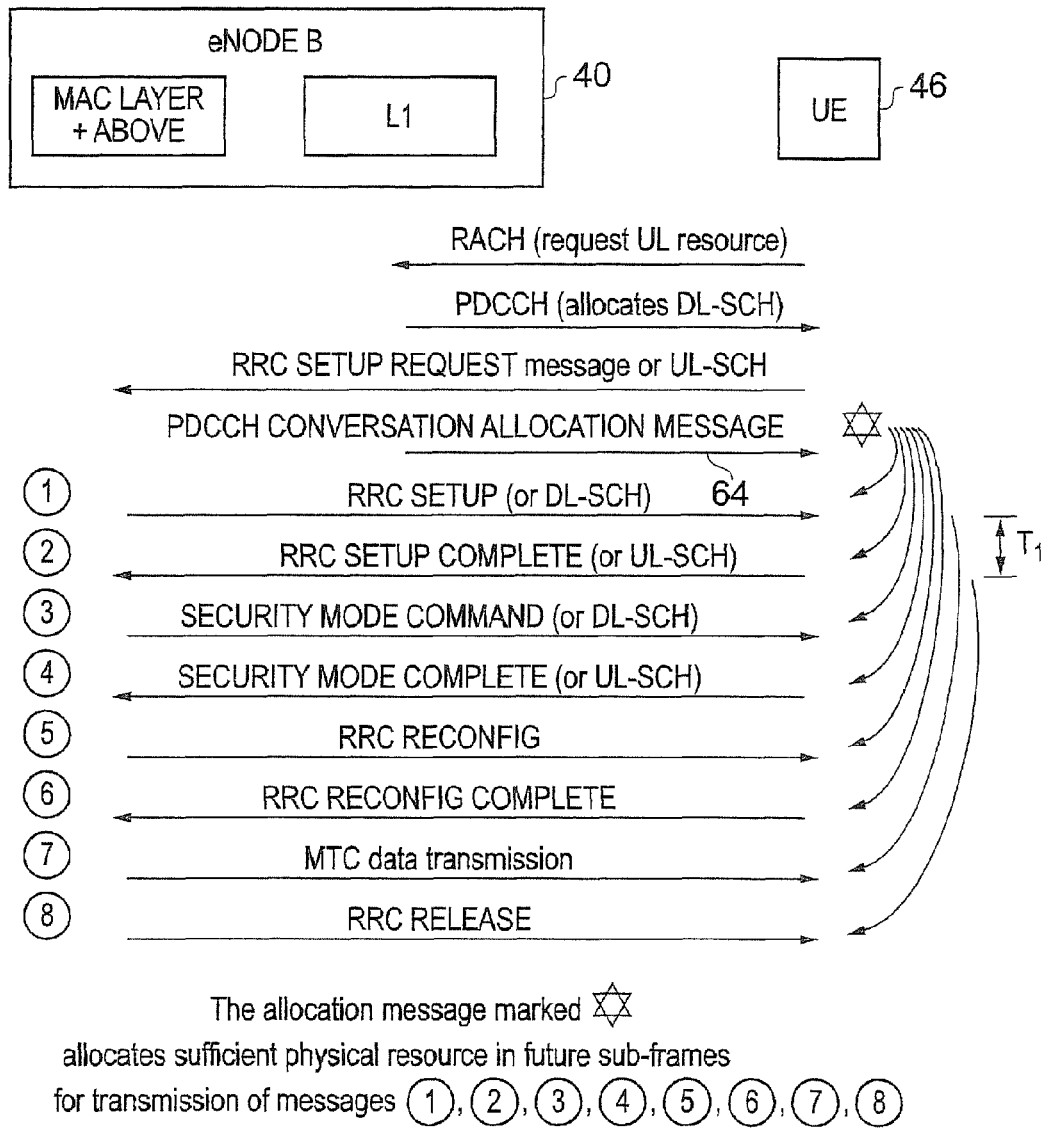
FIG. 6 is a diagram providing a representation of a further example of a message exchange illustrating a further aspect and embodiment of the present invention.

An example of a message exchange which may be required to communicate a data message is illustrated in FIGS. 5 and 6 which provide message flow diagrams corresponding to that shown in FIG. 2. In FIG. 5, an MTC data message is received at the eNodeB 40 at a higher layer which triggers a setup message 62. The message processor 42 within the eNodeB 40 then generates a conversation allocation message and communicates the conversation allocation message via the PDCCH 64, to the communications device. The message processor 42 therefore responds to the data message 60 by recognising the data message as being one which requires one of the predetermined message exchanges using an indication stored in the associated message store 44. Thus using a higher layer signalling, transmission of metadata, or an indication in a header of the data message 60, the message processor 62 is able to identify the message exchange as being one of the predetermined message exchanges within the table of the message store 44. The table provides the message processor 42 with an indication of the uplink and or downlink resources required for communicating one or more signalling messages required to establish a bearer for communicating the data message via the same down-link shared channel (DL-SCH) and also the downlink resources required for communicating the data message on the DL-SCH to communicate the message exchange. Accordingly, the message processor 42 operates in combination with a scheduler of a conventional base station to schedule the uplink and or downlink resources for communicating the one or more associated signalling messages and the downlink shared channel resources for communicating the data message. Thus the conversation allocation message communicated to the communications device 64 identifies the resources which are required to communicated the signalling messages both on the uplink and the downlink and also the down-link resources for communicating the data messages.

Thereafter, the message exchange between the communication device 46 and the eNodeB 40 identified collectively 68 in FIG. 5 continues as for a conventional arrangement illustrated in FIG. 2. In this example embodiment, the message exchange of FIG. 5 does not include individual allocation messages, as illustrated in FIG. 3, due to the use of the conversation allocation message. The same MAC layer and above messages within the message exchange are transmitted in FIG. 5 and FIG. 2.

As explained above, FIGS. 3(*a*) and 3(*b*) provide an illustration of a known example message exchange, which unlike the example shown in FIG. 2, provides an illustration of the messages required to be communicated via the random access channel (RACH) on the uplink and the physical downlink control channel (PDCCH) allocating the downlink shared channel DL-SCH resource on the down-link. Thus in order to communicate each of the messages shown in FIG. 2 where resources must be communicated on the up-link between the communication device 1 and the eNodeB 2 a down-link allocation message is provided via the PDCCH, following a request message for up-link resources via the RACH. The eNodeB 2, therefore responds on the PDCCH with an allocation message for uplink shared channel resources. Correspondingly where the eNode B is allocating resources for communicating on the down-link then an allocation message must be transmitted on the PDCCH allocating down-link shared channel resources to infonn the communication device 1 of the down-link shared channel resources via which it should receive the message concerned. Thus as shown in FIGS. 3(*a*) and 3(*b*) the communications marked with an asterisk "*" are additional allocation messages and request messages communicated on the PDCCH and RACH respectively, which are required to communicate each of the messages shown in FIG. 2. The allocation and request messages can be thought of as lower layer messages compared to the signalling messages and data messages which can be thought of as higher layer messages.

As illustrated in FIG. 6, in accordance with the present technique all of the up-link and down-link shared channel resources are communicated to the mobile communications device 46 in a single conversation allocation message 64 marked with a star. Thus in comparison with FIGS. 3*a* and 3*b* it can be recognised that there is a significant reduction in the communication of RACH messages and PDCCH allocation messages between the mobile communications device 46 and the eNodeB 40. Accordingly, there is a reduction in the amount of communications traffic being communicated via the PDCCH and also the RACH.

Error Recovery

Figure 7:
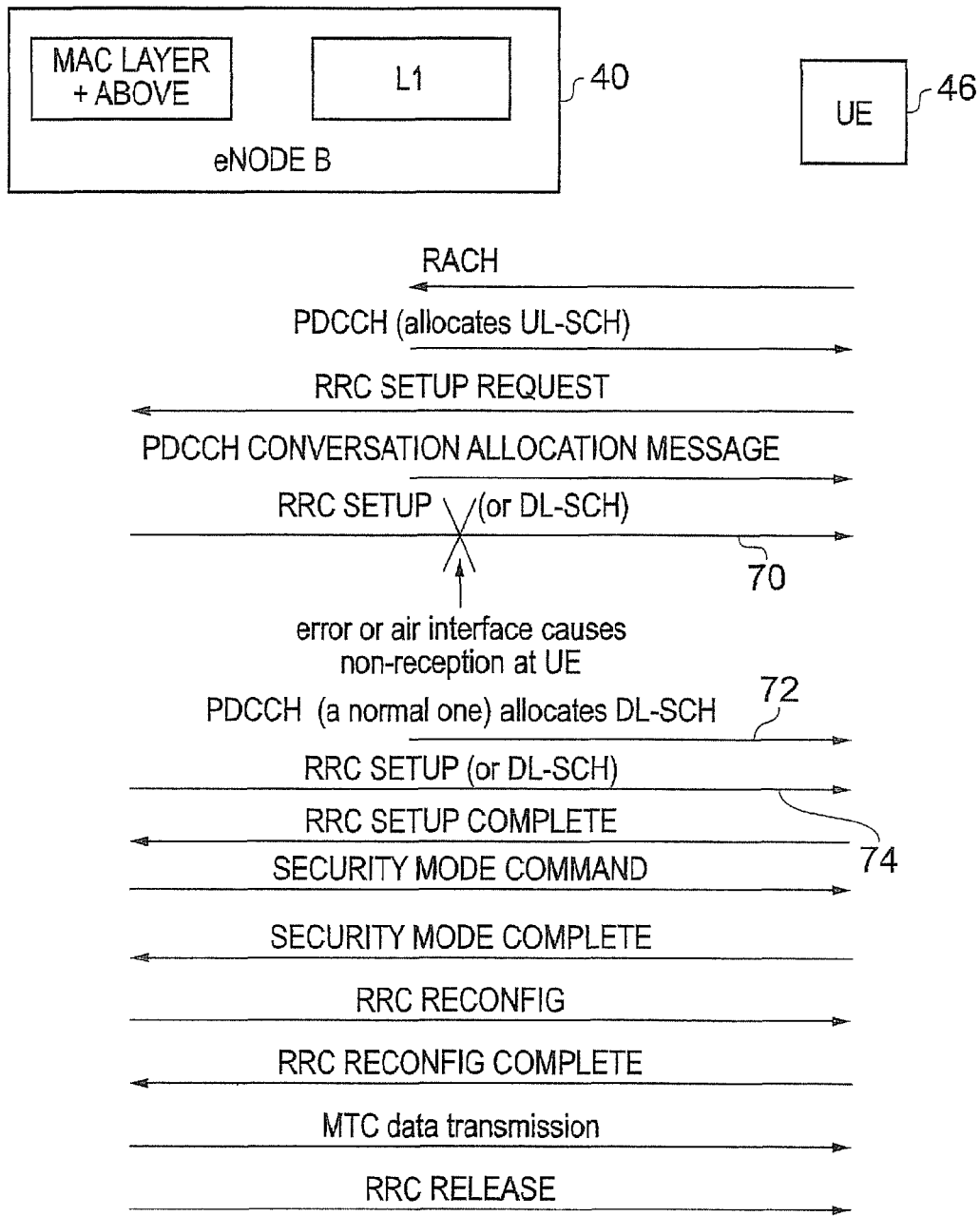
FIG. 7 is a diagram providing a representation of a further example of a message exchange illustrating a further aspect and embodiment of the present invention, when one of the messages of the message exchange is received in error.

FIG. 7 provides an illustration of a further embodiment of the present invention which addresses a problem in which one of the messages exchanged between the eNodeB 40 and the communications device 46 is not received correctly, as a result for example of a transmission error. In FIG. 6, after a conversation allocation message is sent to the mobile communications device, and the up-link and down-link communications resources are allocated by the base station for the message exchange, the base station and the mobile communications device begin exchanging the messages of the exchange using the allocated resources. As will be appreciated one of the purposes of communicating a conventional allocation message, for example, for the down-link shared channel on the PDCCH, or on the up-link requiring an RACH communication as well as a PDCCH communication, is to allocate resources to confirm reception of the signalling message (higher layer message) being communicated. Confirmation reception signalling may alternatively be piggy-backed on the signalling or data messages or may be transmitted implicitly, whereby for example the lack of confirmation reception signalling may indicate an error on a signalling or data message. As illustrated in FIG. 7 a message 70 for example, is not received correctly, as a result of an error in transmission via the wireless access interface. Accordingly, an individual PDCCH allocation message 72 allocates a downlink shared channel resource to re-transmit the message 70 and this message is re-transmitted 74 using the resources assigned in the individual allocation message 72. Thus, the additional allocation message 72 via the PDCCH is a conventional allocation of resources on the down-link shared channel DL-SCH which allocates resources for the re-transmission 74 of the RRC setup message.

According to the example illustrated in FIG. 7, the additional messages 72, 74 are inserted into the conversation to repair the error of the transmission of the RRC set-up message 70. Transmission of the additional messages 72, 74 can be inserted into the message exchange required to communicate the data message as specified by the conversation allocation message 64, because there is sufficient time allowance within the message exchange, as represented by a time T1 shown in FIG. 6, to allow for the insertion of the additional messages 72, 74.

Available Message Exchanges Broadcast from Broadcast Channel

Figure 8:
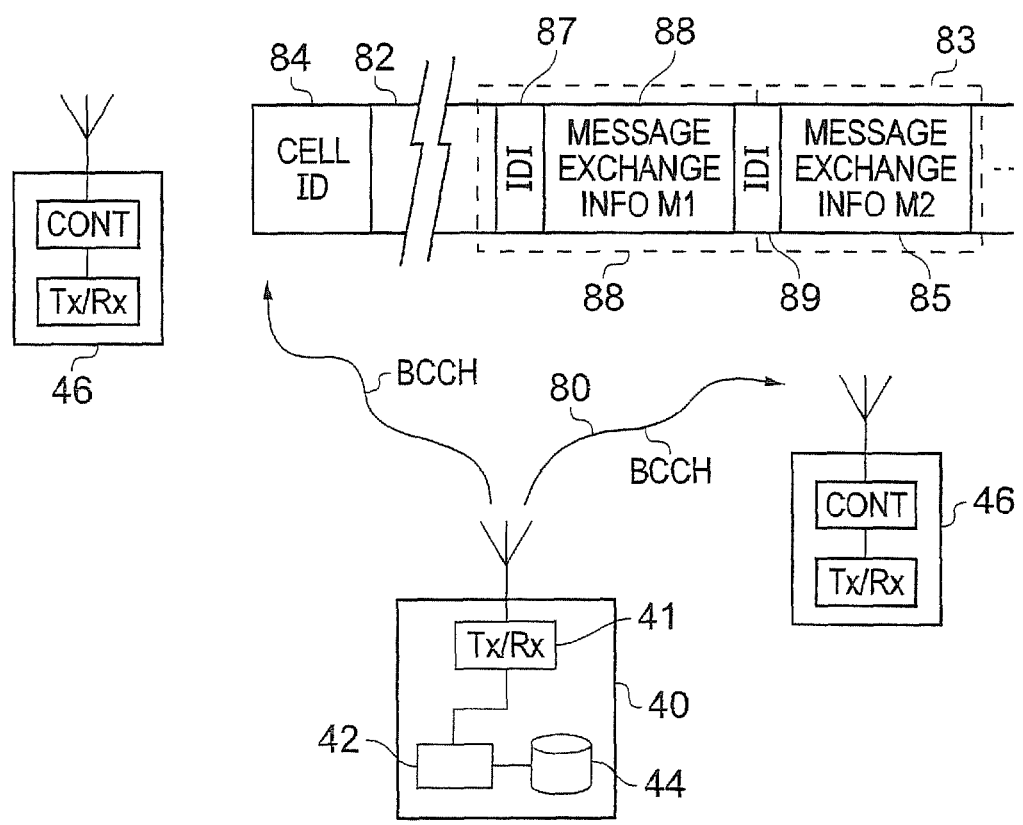
FIG. 8 is a schematic block diagram of a base station communicating a broadcast signal to mobile communications devices according to an example embodiment.

A further example embodiment of the present invention is illustrated in FIG. 8. In FIG. 8 a base station 40 is arranged to transmit a broadcast signal 80 periodically to all of the communications devices 46 which are attached to base station 40. The message processor 42 in combination with the message store 44 is arranged to communicate an indication of each of the recognised message exchanges stored in the message store 44 which the base station 40 can recognise and communicate using a conversation allocation message 64. Accordingly, a convenient way of establishing which of the base stations in the network can communicate predefined message exchanges and alos provides those base stations with a technique for indicating the types of message which can be recognised is provided. An example of the content of the broadcast signal 80 is illustrated by a message format 82. The broadcast message format 82, includes conventional field 84 as well as a field 86 providing information on a predetermined message exchange which can be communicated between the base station 40 and communication device 46. The information on a predetermined message exchange consists of an identification of the message exchange 87 and message exchange information 88 where the message exchange information consists of a list of communications resources in the down-link and/or up-link required to effect the message exchange. Furthermore, a flexible arrangement is provided for changing the number and type of message exhcnages which can be communicated and also configuring parts of the network which can support the use of conversation allocation messages.

When resources for a message exchange are allocated by the base station 40 to a communications device 46, the conversation allocation message 64 may contain the identification of the message exchange 87. The communications device uses the identification of the message exchange in the conversation allocation message together with the definition of the resources 88 associated with that identification in order to set up the resources required to effect the message exchange. The base station 40 may additionally include an offset within the communications allocation message that may provide a scaling factor to the allocated resources, either increasing the resources by the scaling factor or translating the resources in the time/frequency space to another location.

Figure 11:
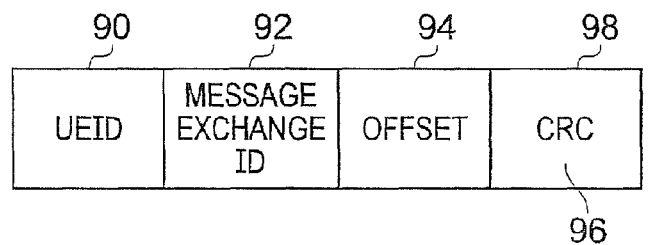
FIG. 11 is a schematic representation of a conversation allocation message.

An example embodiment of the conversation allocation message transmitted is shown in FIG. 11. The conversation allocation message 98 consists of a UE identity 90, a message exchange identification 92, an offset 94 and a cyclic redundancy check 96. The message exchange identification 92 corresponds to one of the identifications 87 that is signalled on the broadcast channel. Given the message exchange identification 92 and the definition of the corresponding communications resources in the message exchange information 88 as signalled on the broadcast channel, the communications device can ascertain the communications resource that are assigned to it. The offset 94 can signal for example a scaling factor to be applied to the communications resources assigned via the message exchange identification 92, the scaling factor for example either increasing the resources applied by the scaling factor or translating the resources in the time frequency space to another location.

In an alternative embodiment, the conversation allocation message 64 explicitly indicates communications resources to be applied during the message exchange.

As will be appreciated further embodiments of the present invention can be arranged to communicate conversation allocation messages for up-link communications. That is to say, the example embodiments illustrated above can be applied to communicating a data message of a predetermined type on the up-link. This would be achieved by the communications device sending a request to communicate the data message and the message processor 42 responding by communicating a corresponding conversation allocation message on the down-link PDCCH, to allocate communications resource on the up-link and the down-link shared channels as illustrated for the embodiments explained above for a down-link data message.

Further Examples

Figure 9:
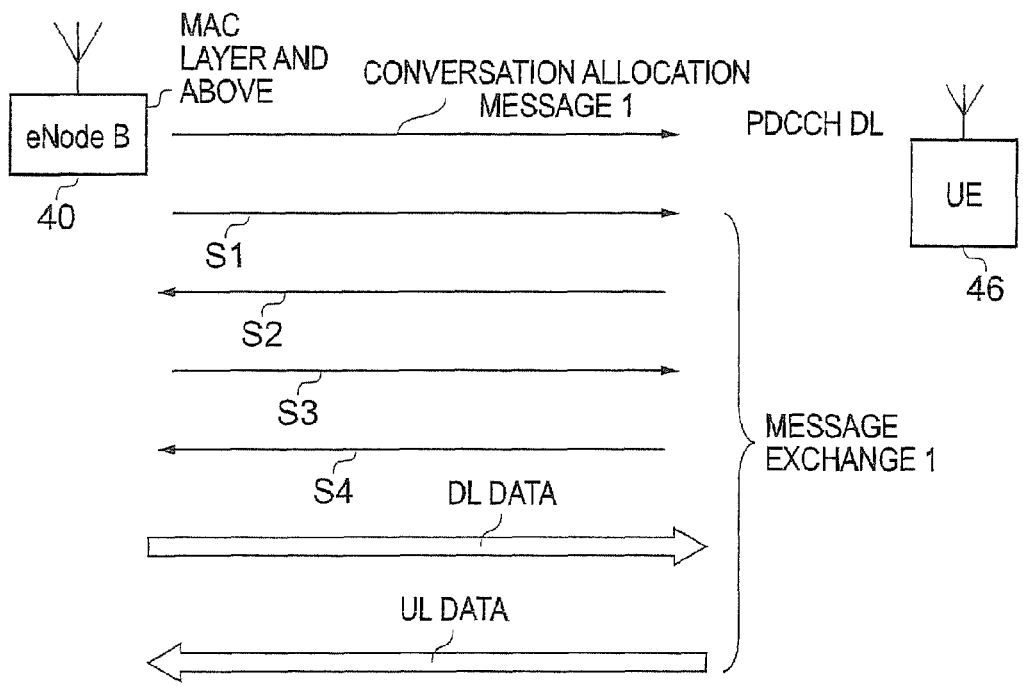
FIG. 9 are diagrams providing a representation of a further example of a message exchange diagram illustrating a further aspect and embodiment of the present invention.

Further examples of message exchanges which can be allocated by the message processor 42 using a conversation allocation message as explained above are provided in FIGS. 9 and 10. In FIG. 9, the message exchange includes the communication of signalling messages S1, S2, S3, S4 which are communicated on the up-link and the down-link as shown. Furthermore part of the message exchange of FIG. 9 includes the communication of data messages on the down-link DL_DATA as well as the up-link UL_DATA. This message exchange can be identified using an appropriate label such as CONV 1. The label CONV1 may be associated with information on a predetermined message exchange 86 and the label CONV1 may map to a message exchange identification 87. As shown, the resources for the message exchange CONV1 are allocated using a conversation allocation message CONV1 MESSAGE, which is transmitted on the down-link PDCCH.

Figure 10:
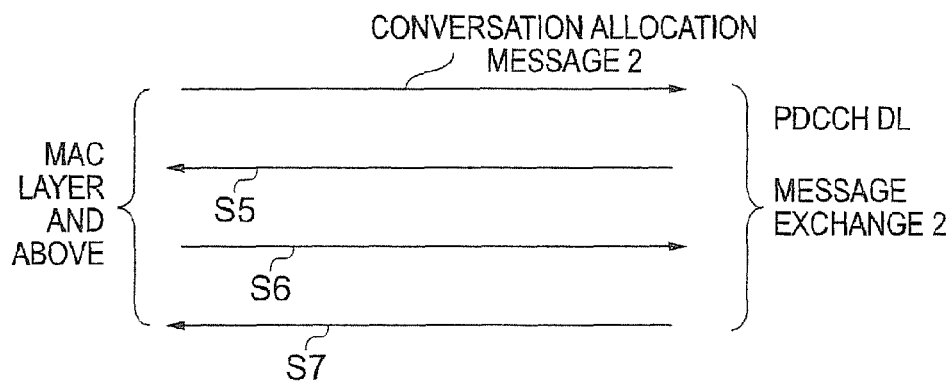
FIG. 10 are diagrams providing a representation of a further example of a message exchange diagram illustrating a further aspect and embodiment of the present invention.

FIG. 10 in contrast illustrates a message exchange CONV2 which is comprised of three signalling messages only S5, S6, S7. Allocation of the communications resources for the message exchange CONV2 is provided by a second conversation allocation message CONV2 MESSAGE on the down-link PDCCH. The label CONV2 may be associated with a second information on a predetermined message exchange 83 and the label CONV2 may map to a message exchange identification 89.

Various events can be envisaged which might be used by the message processor 42 to identify the message exchange. For example, a signalling message indicating that the mobile communications device is to handover from one base station to another, and transmitted either on the down-link or the up-link can be used to identify that the message is part of a message exchange and accordingly generate and send a corresponding conversation allocation message. Another example, could be that a mobile communications device has no more data to send, a power down of the communications device or a time-out etc. In this latter example, a message exchange consisting of signalling messages as shown in FIG. 10 might occur.

Various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as 3G, GSM, UMTS, CDMA2000 etc. The term communications device as used herein can be replaced with user equipment (UE), mobile communications device, mobile terminal etc. Furthermore, although the term base station has been used interchangeably with eNodeB it should be understood that there is no difference in functionality between these network entities and that in other architectures the base station will combine with radio network controller to perform some of the functions which have been performed by the eNodeB/Base Station in the above description and therefore corresponding changes could be made when applying the above invention to GPRS, 3G or other architectures.

The invention claimed is:

1. A communications system, comprising:
a mobile radio network including one or more base stations that communicate data to and from communications devices via a wireless access interface, wherein
the one or more base stations include a message processor and a message memory,
the message memory stores an indication of each of one or more message exchanges in a set of predetermined message exchanges between the one or more base stations and one or more of the communications devices, each message exchange comprising a set of predetermined messages and requiring predetermined uplink and/or down-link communications resource for communicating the message exchange on the up-link and/or down-link between a base station and the one or more of the communications devices,
the message processor is configured to
generate, using each indication of the one or more message exchanges stored in the message memory, a conversation allocation message for communication to the one or more of the communications devices, the conversation allocation message providing an indication to the one or more of the communications devices of an allocation of the communications resource on the down-link and/or the up-link for communicating the one or more messages of the message exchange, communicate the conversation allocation message to the one or more of the communications devices, and transmit a broadcast signal that indicates the set of predetermined messages which are available for communication via the one or more base stations using the conversation allocation message, and in response to the conversation allocation message, each of the one or more of the communications devices and a corresponding base station communicate the one or more messages of the message exchange using the communications resource allocated by the conversation allocation message.

2. The communications system as claimed in claim 1, wherein the message processor is configured to respond to an indication that a particular message exchange is to be communicated via the wireless access interface, determine whether the particular message exchange is one of the set of predetermined message exchanges, and when the message exchange is one of the set of predetermined message exchanges, generate the conversation allocation message from the particular message exchange from the indication provided in the message memory.

3. The communications system as claimed in claim 1, wherein the message memory stores, for each message exchange, the conversation allocation message for allocating the up-link and/or down-link communications resource for communicating the message exchange.

4. The communications system as claimed in claim 3, wherein the message processor is configured to receive, from a higher layer server, an indication of the message exchange, and generate the conversation allocation message from the indication of the message exchange by retrieving the conversation allocation message using the indication of the message exchange.

5. The communications system as claimed in claim 1, wherein the message processor is configured to recognise the message exchange by identifying a signalling message which is received from one of the communications devices or is to be transmitted to one of the communications devices, and generate the conversation allocation message from the recognised message exchange.

6. The communications system as claimed in claim 5, wherein the signalling message provides an indication of a handover of the one or more communications devices from one base station to another base station, and the signalling message is communicated on the up-link or the down-link.

7. The communications system as claimed in claim 5, wherein the message exchange includes a data message for communication on the up-link or the down-link, and the indication of the message exchange is a length of the data message to be communicated to or from the one or more communications devices.

8. The communications system as claimed in claim 6, wherein the message exchange includes a data message for communication on the up-link or the down-link, and the conversation allocation message allocates the communications resource on one or both of a down-link or up-link shared channel for the communication of the one or more associated signalling messages and the data message.

9. A communications device for communicating data via a mobile radio network, the communications device comprising:

a transmitter/receiver; and control circuitry that controls the transmitter/receiver to transmit data to and receive data from one or more base stations of the mobile radio network via a wireless access interface, wherein the one or more base stations include a message processor and a message memory, the message memory stores an indication of each of one or more message exchanges in a set of predetermined message exchanges between the one or more base stations and the communications device, each message exchange comprising a set of predetermined messages and requiring predetermined up-link and/or down-link communications resource for communicating the message exchange on the up-link and/or down-link between a base station and the communications device, the message processor is configured to generate, using each indication of the one or more message exchange stored in the message memory, a conversation allocation message for communication to the communications device, the conversation allocation message providing an indication to the communications device of an allocation of the communications resource on the down-link and/or the up-link for communicating the one or more messages of the message exchange, communicate the conversation allocation message to the communications device, and receive a broadcast signal that indicates the set of predetermined messages which are available for communication via the one or more base stations using the conversation allocation message, and the control circuitry, in response to receiving the conversation allocation message from the message processor, controls the transmitter/receiver to communicate the predetermined message of the message exchange using the up-link and/or down-link communications resource allocated by the conversation allocation message.

10. The communications device as claimed in claim 9, wherein the message exchange includes communicating a message on the up-link from the transmitter/receiver to the base station, and the conversation allocation message is sent, from the message processor in response to a request for the communications resource to communicate the message, the request sent by the communications device to the base station.

11. The communications device as claimed in claim 9, wherein the conversation allocation message allocates the communications resource on one or both of a down-link or up-link shared channel for the communication of the message exchange.

12. An infrastructure equipment of a mobile radio network, the infrastructure equipment comprising:

a transmitter/receiver that communicates data to and from one or more communications devices;

a message memory that stores an indication of each of one or more message exchanges in a set of predetermined message exchanges between the infrastructure equipment and the one or more communications devices, each message exchange comprising a set of predetermined messages and requiring predetermined up-link and/or down-link communications resource for communicating the message exchange on the up-link and/or down-link, between the infrastructure equipment and the communications device; and a message processor configured to
generate, using each indication of the one or more message exchanges stored in the message memory, a conversation allocation message for communication to the one or more of the communications devices, the conversation allocation message providing an indication to the one or more of the communications devices of an allocation of the communications resource on the down-link and/or the up-link for communicating the one or more messages of the message exchange,
communicate the conversation allocation message to the one or more of the communications devices,
transmit a broadcast signal that indicates the set of predetermined messages which are available for communication via the infrastructure equipment using the conversation allocation message, and
control the transmitter/receiver to communicate the message exchange with the communications device.

13. The infrastructure equipment as claimed in claim 12, wherein the conversation allocation message is generated by the message processor in response to a request for the communications resource to communicate a message, the request received from one of the communications devices.

14. The infrastructure equipment as claimed in claim 12, wherein
a signalling message provides an indication of a handover of the one or more communications devices from one base station to another base station,
the message exchange includes a data message for communication on the up-link or the down-link,
the signalling message is communicated on the up-link or the down-link, and
the conversation allocation message allocates the communications resource on one or both of a down-link or up-link shared channel for the communication of the one or more associated signalling messages and the data message.

15. The infrastructure equipment as claimed in claim 12, wherein
wherein the conversation allocation message allocates the communications resource on one or both of a down-link or up-link shared channel for the communication of the message exchange.

16. The infrastructure equipment as claimed in claim 12, wherein the message processor is configured to
respond to an indication that a particular message exchange is to be communicated via the wireless access interface,
determine whether the particular message exchange is one of the set of predetermined message exchanges, and
when the message exchange is one of the set of predetermined message exchanges, generate the conversation allocation message from the particular message exchange from the indication provided in the message memory.

17. The infrastructure equipment as claimed in claim 12, wherein the message processor is configured to
recognise the message exchange by identifying a signalling message which is received from one of the communications devices or is to be transmitted to one of the communications devices, and
generate the conversation allocation message from the recognised message exchange.

18. The infrastructure equipment as claimed in claim 17, wherein
the signalling message provides an indication of a handover of the one or more communications devices from one base station to another base station, and
the signalling message is communicated on the up-link or the down-link.

19. The infrastructure equipment as claimed in claim 18, wherein
the message exchange includes a data message for communication on the up-link or the down-link, and
the conversation allocation message allocates the communications resource on one or both of a down-link or up-link shared channel for the communication of the one or more associated signalling messages and the data message.

20. The infrastructure equipment as claimed in claim 17, wherein the message exchange includes a data message for communication on the up-link or the down-link, and
the indication of the message exchange is a length of the data message to be communicated to or from the one or more communications devices.

21. A method of communicating via a mobile radio network including one or more base stations that communicate data to and from communications devices via a wireless access interface, the method comprising:
storing, by circuitry of one of the one or more base stations, an indication of each of one or more message exchanges in a set of predetermined message exchanges between the base stations and one or more of the communications devices, each message exchange comprising a set of predetermined messages and requiring predetermined up-link and/or down-link communications resource for communicating the message exchange on the up-link and/or down-link between a base station and the one or more of the communications devices;
generating, by circuitry using each stored indication of the one or more message exchanges, a conversation allocation message for communication to the one or more of the communications devices, the conversation allocation message providing an indication to the one or more of the communications device of an allocation of the communications resource on the down-link and/or the up-link for communicating the one or more messages of the message exchange;
communicating, by the circuitry, the conversation allocation message to the one or more of the communications devices;
transmitting, by the circuitry, a broadcast signal that indicates the set of predetermined messages which are available for communication via the one or more base stations using the conversation allocation message; and
in response to the conversation allocation message, communicating, by the circuitry, the one or more messages of the message exchange to the one or more of the communications devices using the communications resource allocated by the conversation allocation message.

* * * * *